United States Patent
Russo et al.

(10) Patent No.: US 10,977,826 B1
(45) Date of Patent: Apr. 13, 2021

(54) SAFETY DETECTION CAMERA SYSTEM FOR DOOR CLOSURE

(71) Applicant: MOTOROLA SOLUTIONS, INC., Chicago, IL (US)

(72) Inventors: Pietro Russo, Melrose, MA (US); Azamat Sarkytbayev, Boston, MA (US); Doran Ingalls, Burnaby (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 7 days.

(21) Appl. No.: 16/717,038

(22) Filed: Dec. 17, 2019

(51) Int. Cl.
*G06T 7/73* (2017.01)
*G06T 7/20* (2017.01)
*G05B 11/01* (2006.01)

(52) U.S. Cl.
CPC ............... *G06T 7/74* (2017.01); *G05B 11/01* (2013.01); *G06T 7/20* (2013.01); *G06T 2207/10016* (2013.01); *G06T 2207/30232* (2013.01); *G06T 2207/30241* (2013.01); *G06T 2207/30252* (2013.01)

(58) Field of Classification Search
CPC .. G06K 9/00335; G06K 9/00771; G06T 7/20; G06T 7/70; G06T 7/74; G06T 2207/30196; G06T 2207/30232; G06T 2207/30241; E05Y 15/40; E05Y 15/73; E05Y 2015/765; E05Y 2015/767; E05Y 2400/54
See application file for complete search history.

(56) References Cited

U.S. PATENT DOCUMENTS

| | | | |
|---|---|---|---|
| RE30,719 E | 8/1981 | Mills | 187/52 R |
| 5,001,557 A * | 3/1991 | Begle | B66B 13/26 |
| | | | 348/166 |
| 5,142,152 A | 8/1992 | Boiucaner | 250/341 |
| 5,698,824 A | 12/1997 | Platt | 187/317 |
| 5,886,307 A | 3/1999 | Full et al. | 197/317 |
| 5,925,858 A | 7/1999 | Full et al. | 187/317 |
| 6,345,105 B1 * | 2/2002 | Nitta et al. | G06T 7/246 |
| | | | 318/466 |
| 6,469,464 B1 | 10/2002 | McCall | 318/445 |
| 8,904,708 B2 | 12/2014 | Zacchio et al. | 49/25 |
| 2002/0118113 A1 * | 8/2002 | Oku et al. | G08B 13/181 |
| | | | 340/573.1 |
| 2016/0165191 A1 | 6/2016 | Rasheed et al. | H04N 7/185 |
| 2019/0330026 A1 * | 10/2019 | Schmidt et al. | B66B 13/26 |
| 2020/0284082 A1 * | 9/2020 | Watanabe | B61L 27/0094 |

* cited by examiner

*Primary Examiner* — Andrew W Johns

(57) ABSTRACT

A computer implemented method, comprising: detecting presence of an object of interest within a plurality of image frames received from a sensor; determining that the object of interest is moving towards an automatic door that is configured to close within a predetermined time period; determining, based on position, speed and direction of the object of interest, a likelihood that the object of interest may impede closing of the automatic door; and when the likelihood exceeds a threshold value, maintaining the automatic door in an open position for a longer period of time than the predetermined time period.

20 Claims, 7 Drawing Sheets

SAFETY DETECTION CAMERA SYSTEM FOR DOOR CLOSURE

BACKGROUND

Many locations, for example commuter trains and elevators, use a timed door open and closure system. In these systems, doors open for a fixed period of time when the train or elevator comes to a rest to allow passengers to enter and exit. When the period of time ends, the doors automatically close. This creates a risk that passengers can be caught by the doors closing, which in turn risks injuring the passenger. While solutions exist that use proximity detectors to detect if people are within a certain fixed distance from the door, this can create both false positives, i.e. someone loitering near the door, and false negatives, as a person moving quickly towards the door, but outside the fixed distance may be missed.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
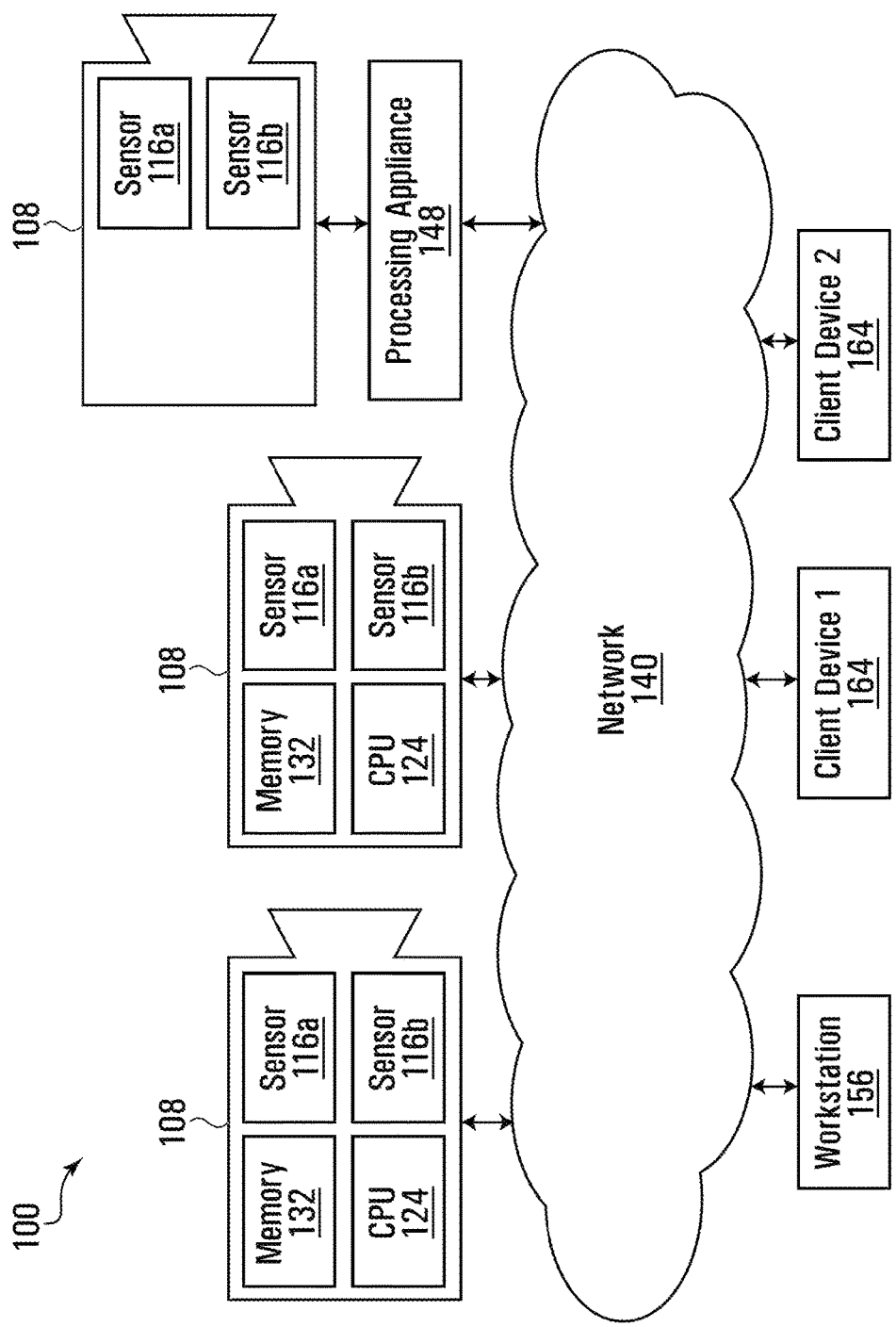
FIG. 1 illustrates a block diagram of connected devices of a video capture and playback system according to an example embodiment.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Herein provided is a safety detection camera system for door closure and associated method.

An aspect of the present specification provides a computer implemented method, comprising: detecting presence of an object of interest within a plurality of image frames received from a sensor; determining that the object of interest is moving towards an automatic door that is configured to close within a predetermined time period; determining, based on position, speed and direction of the object of interest, a likelihood that the object of interest may impede closing of the automatic door; and when the likelihood exceeds a threshold value, maintaining the automatic door in an open position for a longer period of time than the predetermined time period.

Another aspect of the present specification provides a sensor configured to detect a presence of an object of interest within a plurality of image frames; a processor, configured to: determine that the object of interest is moving towards the automatic door, the automatic door configured to close within a predetermined time period; determine, based on position, speed and direction of the object of interest, a likelihood that the object of interest may impede closing of the automatic door; and when the likelihood exceeds a threshold value, maintain the automatic door in an open position for a longer period of time than the predetermined time period.

Other aspects of the present specification provide that the sensor is a video camera; video analytics are used to determine position, speed and direction of the object of interest; the automatic door is positioned on a train; the position, speed and direction of the object of interest is defined as at least a vector; the vector is used to determine a predicted vector of movement; the vector is compared to similar movement vectors generated by the sensor in the past; the predicted vector is at least partially based on movement associated with the similar movement vectors generated by the sensor in the past; the predicted vector is an average of the similar movement vectors generated by the sensor in the past; and/or the automatic door is for an elevator.

Each of the above-mentioned embodiments will be discussed in more detail below, starting with example communication system and device architectures of the system in which the embodiments may be practiced, followed by an illustration of processing blocks for achieving an improved technical method, device, and system for a safety detection camera system for door closure. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, therein illustrated is a block diagram of connected devices of an image capture and playback system 100 according to an example embodiment. For example, the image capture and playback system 100 may be used to capture image data, in which case it acts at least as a video surveillance system. The image capture and playback system 100 includes hardware and software that perform the processes and functions described herein.

The image capture and playback system 100 includes at least one image capture device 108 being operable to capture a plurality of images and produce image data representing the plurality of captured images. The image capture device 108 (hereinafter interchangeably referred to as a "camera 108") includes security video cameras.

Each image capture device 108 includes at least one image sensor 116 for capturing a plurality of images. The image capture device 108 may be a digital video camera and the image sensor 116 may output captured light as a digital data. For example, the image sensor 116 may be a CMOS, NMOS, or CCD sensor. In at least one different example embodiment (not depicted), the image capture device 108 may comprise an analog camera connected to an encoder, with the encoder digitizing analog video captured by the analog camera for subsequent processing.

A plurality of sequential image frames may together form a video captured by an image capture device 108. Each image frame may be represented by a matrix of pixels, each pixel having a pixel image value. For example, the pixel image value may be a single numerical value for grayscale (such as, for example, 0 to 255) or a plurality of numerical values for colored images. Examples of color spaces used to represent pixel image values in image data include RGB, YUV, CYKM, YCBCR 4:2:2, YCBCR 4:2:0 images.

"Metadata" or variants thereof herein refers to information obtained by computer-implemented analyses and/or processing of image and/or non-image data, including video. For example, processing video may include, but is not limited to, image processing operations, analyzing, managing, compressing, encoding, storing, transmitting, and/or playing back the image data. Analyzing the video may include segmenting areas of image frames and detecting visual objects, and tracking and/or classifying visual objects located within the captured scene represented by the image data. The processing of the image data may also cause additional information regarding the image data or visual objects captured within the images to be output. That additional information is commonly referred to as "metadata". The metadata may also be used for further processing of the image data, such as drawing bounding boxes around detected objects in the image frames.

In at least some example embodiments, the at least one image sensor 116 is configured to capture images in the visible light frequency range, which in at least some example embodiments is between about 400 nm to about 700 nm. However, the image capture device 108 need not be restricted to capturing visible light images; the image sensor 116 may additionally or alternatively be used to capture images using invisible light. For example, the image sensor 116 may additionally or alternatively be configured to capture images using any one or more of ultraviolet (UV) light; infrared (IR) light; near infrared (NIR) light; short-wavelength infrared (SWIR) light; medium or mid-wavelength infrared light (MWIR); and long-wavelength infrared light (LWIR) light. In at least some example embodiments, UV light comprises wavelengths selected from a range of approximately 10 nm to 400 nm; IR light comprises wavelengths selected from a range of approximately 400 nm to 1 mm; NIR light comprises wavelengths selected from a range of approximately 0.75 µm to 1.4 µm; SWIR light comprises wavelengths selected from a range of approximately 400 nm to 1 mm; MWIR light comprises wavelengths selected from a range of approximately 3 µm to 8 µm; and LWIR comprises wavelengths selected from a range of approximately 8 µm to 15 µm.

Data generated using the image sensor 116 is herein referred to as "image data". In FIG. 1, the image capture device 108 comprises a single image sensor 116 that is configured to capture light over the entire visible light frequency range; in at least some different example embodiments, the device 108 and/or the system 100 may comprise multiple sensors 116, with each of the sensors 116 configured to capture light spanning a different portion of the visible or invisible light frequency ranges.

The at least one image capture device 108 may include a dedicated camera. It will be understood that a dedicated camera herein refers to a camera whose principal feature is to capture images or video. In some example embodiments, the dedicated camera may perform functions associated to the captured images or video, such as but not limited to processing the image data produced by it or by another image capture device 108. For example, the dedicated camera may be a surveillance camera, such as any one of a pan-tilt-zoom camera, dome camera, in-ceiling camera, box camera, and bullet camera.

Additionally or alternatively, the at least one image capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller. More generally, the at least one image capture device 108 may include a combination device, which is any device comprising a camera and at least one additional device that has non-camera functionality, and in which the camera and at least one additional device are contained within a single housing or are otherwise suitably collocated. For example, an intercom that comprises a camera collocated within the same housing as a display and an audio transceiver is an example of a combination device.

In at least some example embodiments, the image capture device 108 may be a mobile device, examples of which include the laptop, tablet, drone device, and smartphone. The mobile device may have its own propulsion unit, such as the drone device; alternatively, the mobile device may lack a propulsion unit, such as the laptop, tablet, and smartphone.

Each image capture device 108 includes one or more processors (CPUs) 124, one or more memory devices 132 coupled to the processors and one or more network interfaces. The memory device can include a local memory (such as, for example, a random access memory and a cache memory) employed during execution of program instructions. The processor executes computer program instructions (such as, for example, an operating system and/or application programs), which can be stored in the memory device.

In various embodiments the processor 124 may be implemented by any suitable processing circuit having one or more circuit units, including a digital signal processor (DSP), graphics processing unit (GPU), video or vision processing unit (VPU), embedded processor, etc., and any suitable combination thereof operating independently or in parallel, including possibly operating redundantly. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program code. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device 108 may be implemented together within a system on a chip (SOC). For example, the processor 124, the memory device 132 and the network interface may be implemented within a SOC. Furthermore, when implemented in this way, a general purpose processor and one or more of a GPU or VPU, and a DSP may be implemented together within the SOC. The SOC may include a neural network, such as a convolutional neural network (CNN).

Continuing with FIG. 1, each of the at least one image capture device 108 is connected to a network 140. Each image capture device 108 is operable to output image data representing images that it captures and transmit the image data over the network.

Sensor 116 may be a non-image sensor that captures data hereinafter referred to as "non-image data". For example, the non-image sensor may be configured to capture data using radiofrequency (RF) radiation (e.g., Bluetooth™ and Wi-Fi™ signals for tracking phones and devices); an ultra-wideband signal sensor to measure location such as when using an ultra-wideband real-time location system (UWB RTLS); a depth sensor, such as a time-of-flight depth sensor which comprises part of a 3D camera; an ultrasound sensor; a Hall Effect sensor (e.g., a Reed Switch); a mechanical switch (e.g., a door contact); a six degree-of-freedom (6DOF) sensor; a nine degree-of-freedom (9DOF) sensor; an environmental sensor, such as an air quality sensor (e.g., for measuring particulates and specific gases such as carbon monoxide), a temperature sensor, a humidity sensor, a luminosity sensor, a water level sensor, a water pH sensor, an ionizing radiation sensor, seismic sensor, and a noise level sensor; microwave radiation; radar signals; light in the Terahertz range; and millimeter wave (mmWave) radar radiation. In at least some example embodiments, microwave radiation comprises wavelengths selected from a range of approximately 0.1 cm to 1 m; radar signals comprise wavelengths selected from a range of approximately 2.7 mm to 100 m and, more particularly, from approximately 0.75 cm to 1.1 cm; light in the Terahertz range comprises wavelengths selected from a range of approximately 100 um to 1 mm; and mmWave radiation comprises wavelengths selected from a range of approximately 1 mm to 1 cm.

In the example of a 3D camera, which captures visible light images concurrently with depth information, the 3D camera may comprise both an image sensor for capturing image data (i.e., visible light images), and a non-image sensor for capturing non-image data (i.e., time of flight information, which is used to generate metadata in the form of depth information); alternatively, the 3D camera may for example comprise a pair of image sensors, collect only image data in stereo, and analyze that stereo image data to generate metadata representing the depth information.

Various non-image data sensors may have different applications in different example embodiments. For example, a 3D camera may be used for 3D localization, people tracking applications (e.g., a camera may be configured to automatically focus, zoom in on, and/or count the number of people in its field-of-view once motion has been detected), depth sensors, and/or radar sensors may be overlaid with image data; cameras may be configured to automatically focus and/or zoom in on an environmental anomaly detected by an environmental sensor; and a radar sensor may be used for 3D localization.

It will be understood that the network 140 may be any suitable communications network that provides reception and transmission of data. For example, the network 140 may be a local area network, external network (such as, for example, WAN, Internet) or a combination thereof. In other examples, the network 140 may include a cloud network.

In some examples, the data capture and playback system 100 includes a processing appliance 148. The processing appliance 148 is operable to process the video and non-image data output by an image capture device 108. The processing appliance 148 also includes one or more processors and one or more memory devices coupled to the one or more processors (CPU). The processing appliance 148 may also include one or more network interfaces. For convenience of illustration only one processing appliance 148 is shown; however it will be understood that the data capture and playback system 100 may include any suitable number of processing appliances 148.

For example, and as illustrated, the data capture and playback system 100 includes at least one workstation 156 (such as, for example, a server), each having one or more processors including GPUs and/or VPUs. The at least one workstation 156 may also include storage memory. The workstation 156 receives image from at least one image capture device 108, and performs processing of that data. The workstation 156 may further send commands for managing and/or controlling one or more of the image capture devices 108. The workstation 156 may receive raw image data from the image capture device 108. Alternatively or additionally, the workstation 156 may receive data that has already undergone some intermediate processing, such as processing at the image capture device 108, and/or at a processing appliance 148. The workstation 156 may also receive metadata based on the image and/or non-image data and perform further processing of that data.

It will be understood that while a single workstation 156 is illustrated in FIG. 1, the workstation may be implemented as an aggregation of a plurality of workstations.

The data capture and playback system 100 further includes at least one client device 164 connected to the network 140. The client device 164 is used by one or more users to interact with the data capture and playback system 100. Accordingly, the client device 164 includes at least one display device and at least one user input device (such as, for example, a mouse, keyboard, and/or touchscreen). The client device 164 is operable to display on its display device a user interface for displaying information, receiving user input, and playing back video. For example, the client device may be any one of a personal computer, laptop, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation and one or more client devices 164.

In some examples, the data capture and playback system 100 may be implemented without the workstation 156. Accordingly, image processing functionalities may be performed on a system entity other than the workstation 156 such as, for example, the image processing functionalities may be wholly performed on the one or more image capture devices 108. Alternatively, the image processing functionalities may be, for example, shared amongst two or more of the image capture device 108, processing appliance 148, and client devices 164.

Figure 2:
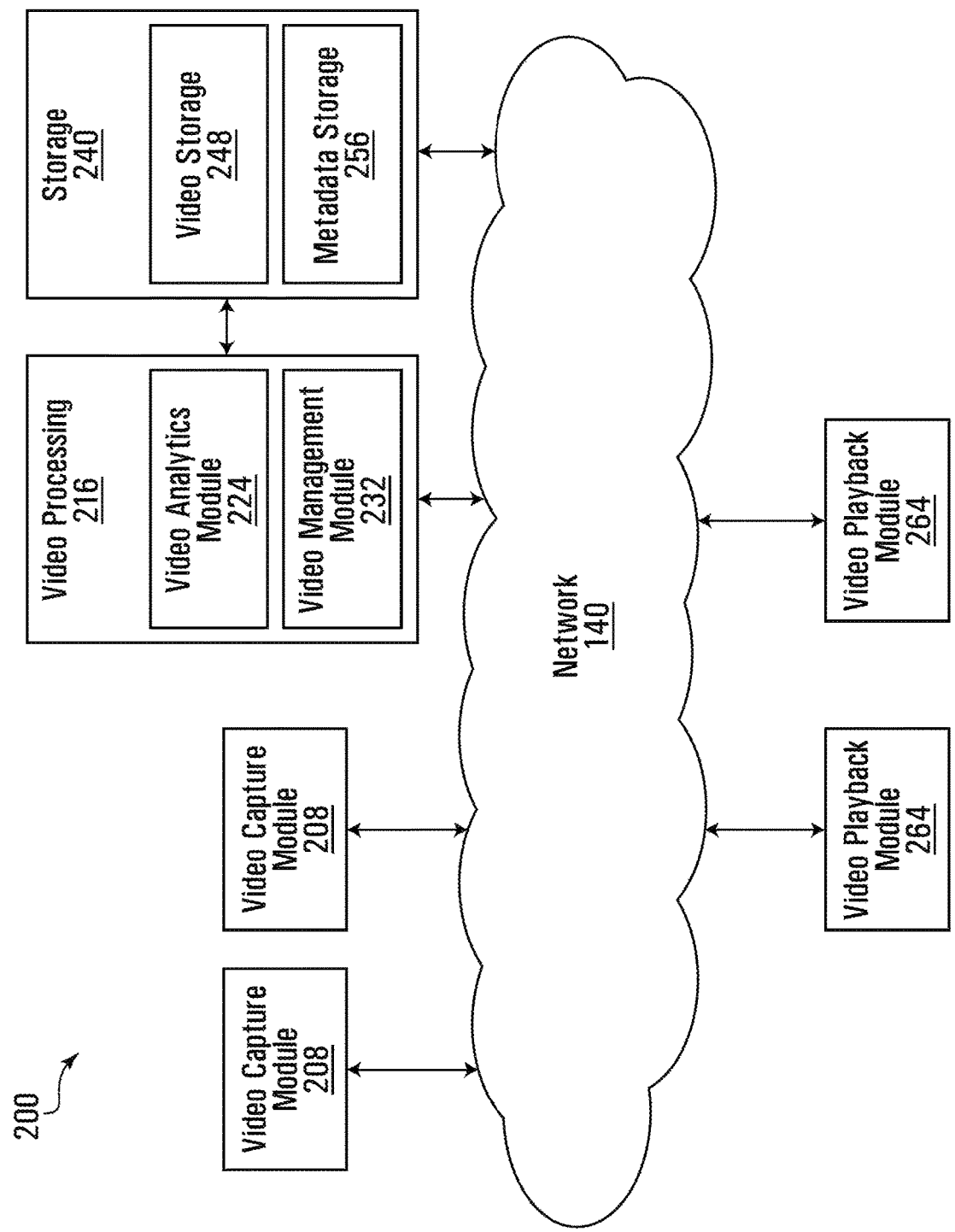
FIG. 2 illustrates a block diagram of a set of operational modules of the video capture and playback system according to the example embodiment of FIG. 1.

Referring now to FIG. 2, there is illustrated a block diagram of a set 200 of operational modules of the data capture and playback system 100 according to one example embodiment. The operational modules may be implemented in hardware, software, or both on one or more of the devices of the data capture and playback system 100 as illustrated in FIG. 1.

The set 200 of operational modules include at least one video capture module 208. For example, each image capture device 108 may implement the video capture module 208 as an image data capture module. The video capture module 208 is operable to control one or more components (such as, for example, sensor 116, etc.) of an image capture device 108 to capture images.

The set 200 of operational modules includes a subset 216 of video processing modules. For example, and as illustrated, the subset 216 of video processing modules includes a video analytics module 224 and a video management module 232.

The video analytics module 224 receives image and non-image data and analyzes that data to determine properties or characteristics of the captured image or video and/or of objects found in the scene represented by the image or video, and of representations in the non-image data such as radar signatures. Based on the determinations made, the video analytics module 224 may further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, movement tracking, identification of objects "left behind" or "removed", and business intelligence. However, it will be understood that other analytics functions (video or otherwise) known in the art may also be implemented by the video analytics module 224.

The video management module 232 receives image and non-image data and performs processing functions on that data related to image and non-image data transmission, playback and/or storage. For example, the video management module 232 can process that data to permit its transmission according to bandwidth requirements and/or capacity. The video management module 232 may also process the image data according to playback capabilities of a client device 164 (FIG. 1) that will be playing back video, such as processing power and/or resolution of the display of the client device 164. The video management 232 may also process the image and non-image data according to storage capacity within the video capture and playback system 100 for storing that data.

It will be understood that the subset 216 of video processing modules may, in accordance with some example embodiments, include only one of the video analytics module 224 and the video management module 232. Also, in accordance with other alternative example embodiments, the subset 216 of video processing modules may include more video processing modules than the video analytics module 224 and the video management module 232.

The set 200 of operational modules further include a subset 240 of storage modules. For example, and as illustrated, the subset 240 of storage modules includes a video storage module 248 and a metadata storage module 256. The video storage module 248 stores image and/or non-image data, which may be data processed by the video management module 232. The metadata storage module 256 stores information data outputted from the video analytics module 224.

It will be understood that while the video storage module 248 and metadata storage module 256 are illustrated as separate modules, they may be implemented within a same hardware storage device whereby logical rules are implemented to separate stored image and non-image data from stored metadata. In other example embodiments, the video storage module 248 and/or the metadata storage module 256 may be implemented within a plurality of hardware storage devices in which a distributed storage scheme may be implemented. In at least some example embodiments in which distributed storage is used, some image data, non-image data, and/or metadata may be stored locally to the video capture and playback system 100, and some image data, non-image data, and/or metadata may also be stored on distributed storage remote from the system 100, such as on cloud storage. For example, image data, non-image data, and/or metadata of an entire event may be stored locally on the system 100, and select portions of that image data, non-image data, and/or metadata may be concurrently stored on cloud storage. As another example, image data, non-image data, and/or metadata may be stored, in its entirety, both locally and on cloud storage for backup purposes. As another example, some image data, non-image data, and/or metadata may be stored locally, and additional image data, non-image data, and/or metadata may be stored on cloud storage, with the data stored locally differing from the data stored on cloud storage.

The set of operational modules further includes at least one video playback module 264, which is operable to receive image data, non-image data, and/or metadata derived therefrom and visualize that data and/or metadata. The video playback module 264 may play back video when it receives image data, and may also be used to visualize non-image data. For example, non-image data in the form of radar signatures may be used to generate metadata in the form of a depth map that changes over time, and the video playback module 264 may be used to display an animated depth map. As another example, the non-image data may comprise readings from 6DOF sensor, and acceleration readings from that sensor may be visualized as graphs of acceleration over time and displayed using the video playback module 264. The video playback module 264 may be implemented on a client device 164.

The operational modules of the set 200 may be implemented on one or more of the image capture device 108, processing appliance 148, workstation 156, and client device 164 shown in FIG. 1. In some example embodiments, an operational module may be wholly implemented on a single device. For example, the video analytics module 224 may be wholly implemented on the workstation 156. Similarly, the video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of an image capture device 108, processing appliance 148, and workstation 156. Similarly, video management functionalities may be split between one or more of an image capture device 108, processing appliance 148, and workstation 156.

Figure 3:
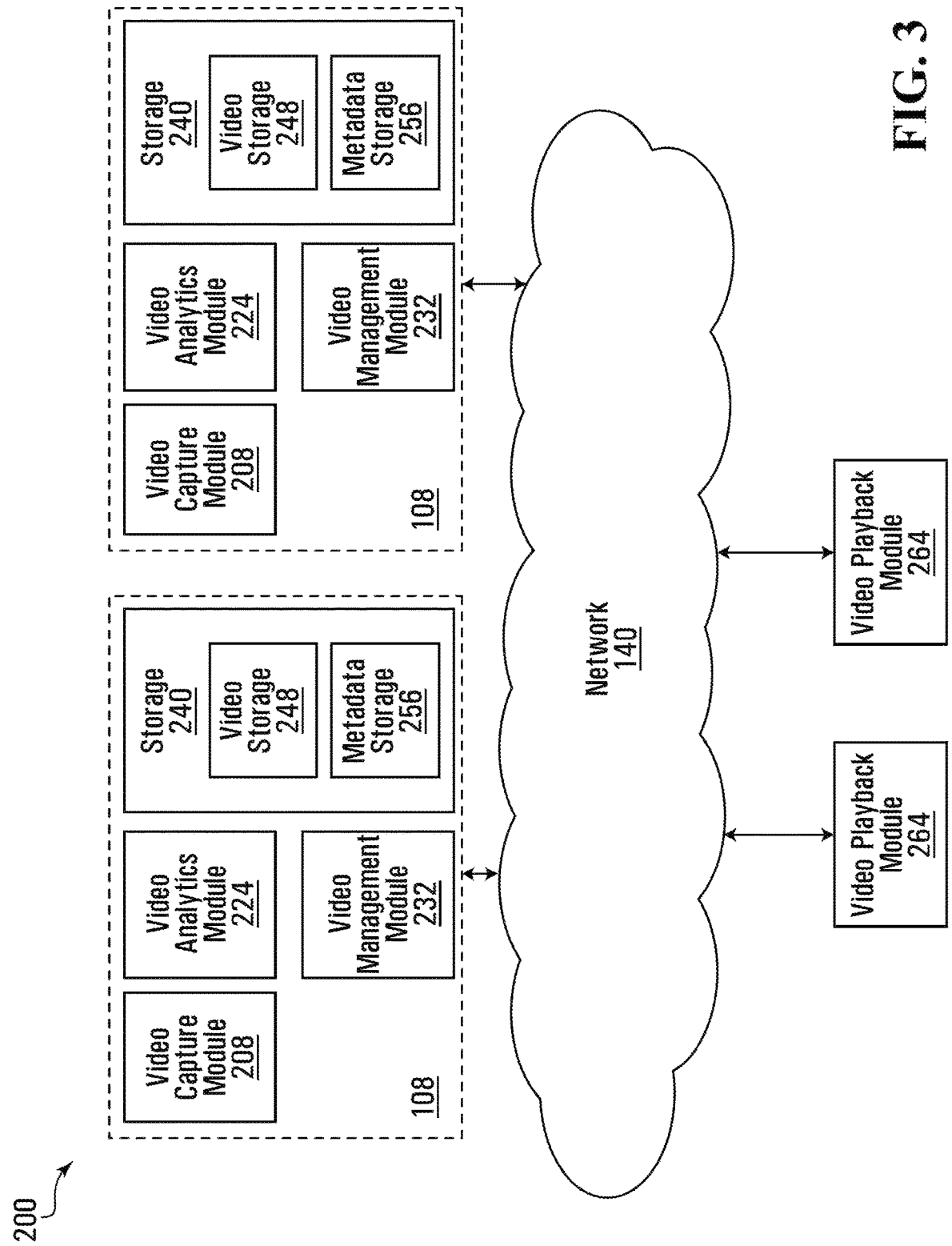
FIG. 3 illustrates a block diagram of a set of operational modules of the video capture and playback system according to the example embodiment of FIG. 1 in which a video capture module, video analytics module, a video management module, and a storage device are wholly implemented on one or more image capture devices included in the video capture and playback system.

Referring now to FIG. 3, there is illustrated a block diagram of a set 200 of operational modules of the video capture and playback system 100 according to one particular example embodiment wherein the video analytics module 224, the video management module 232, and the storage device 240 are wholly implemented on the one or more image capture devices 108. Alternatively, the video analytics module 224, the video management module 232, and the storage device 240 are wholly implemented on the processing appliance 148.

It will be appreciated that allowing the subset 216 of video processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (e.g. manufacturers) or retrofitting an existing video capture and playback system.

It is useful to be able to monitor an object-of-interest in a region, particularly when the region is sufficiently large that it is monitored by multiple image capture devices 108. The monitoring may take any one of multiple forms. For example, in at least some example embodiments the region being monitored may comprise multiple rooms or areas that are concurrently monitored by multiple image capture devices 108, such as RGB cameras. As objects-of-interest in the form of persons pass through the rooms or areas, they may be monitored by at least one of the image capture devices 108. The image data and non-image data collected may be correlated, with the correlation resulting in a determination of which objects-of-interest identified in the non-image data correspond to which objects-of-interest depicted in the image data. A tracking indicator can then be displayed, indicating that correspondence, and permitting a user to track the objects-of-interest.

In at least some example embodiments herein, the data collected by various sensors may be spatially and/or temporally correlated and used to construct a database that stores an annotated journey, or trajectory, which can be represented as a vector, for each object-of-interest being monitored. For example, when the object-of-interest is a person, at any given point on that person's journey the database may store for that person an appearance clip and face clip.

Figure 4:
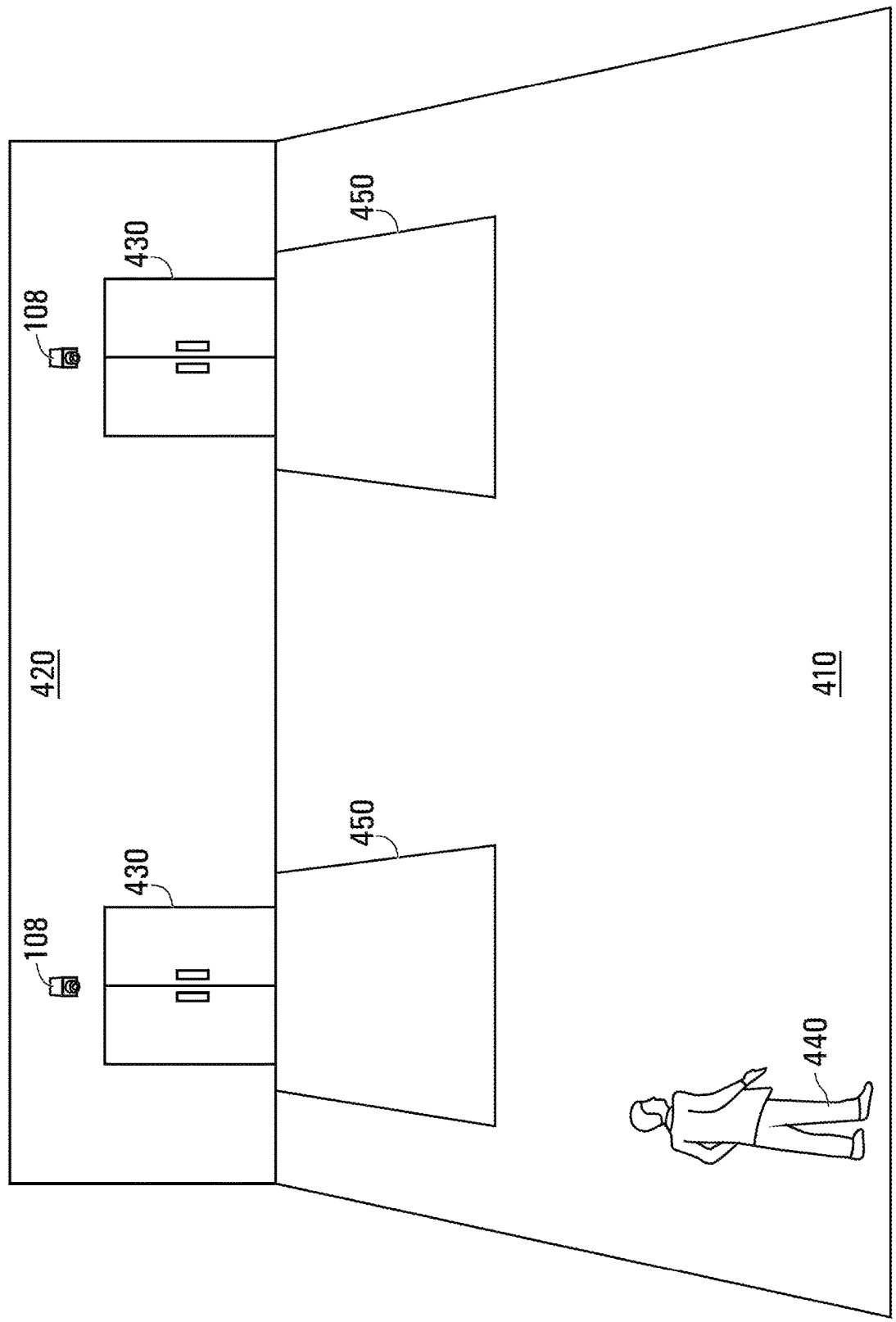
FIG. 4 illustrates a train platform according to an example embodiment.

Referring now to FIG. 4, therein illustrated is an embodiment of a train platform 410 monitored by image capture devices 108, although other applications are also applicable including bus or subway platforms; elevators; entrances, for example to malls or stores; and vehicle systems, such as garage doors and gates. Platform 410 represents an area in which an object of interest, such as passengers 440, can access train 420. On most platforms the location of the automatic doors 430 is known relative to platform 410, i.e. each door 430 will open at the same position on platform 410 each time train 420 stops at platform 410. Doors 430 are configured to open for a predetermined time period when train 420 stops at platform 410. The amount of time door 430 remains open may vary depending on, for example, the anticipated crowd at platform 410 and time of day, but is predetermined, based on previous assumptions.

Image capture devices 108 have a field of view that covers at least a portion of platform 410 and are configured and calibrated to detect and track objects of interest, such as passengers 440, on the platform using video analytics module 224. Image capture devices 108 may be positioned relatively fixed to platform 410, e.g. above platform 410; or alternatively may be positioned relatively fixed to train 420, e.g. above each door 430 of train 420. An area of interest 450 may be defined relative to each door 430. The area of interest 450 may be an area in front of respective door 430 or may be a line, for example a line in front of or running across the threshold of door 430.

Figure 5:
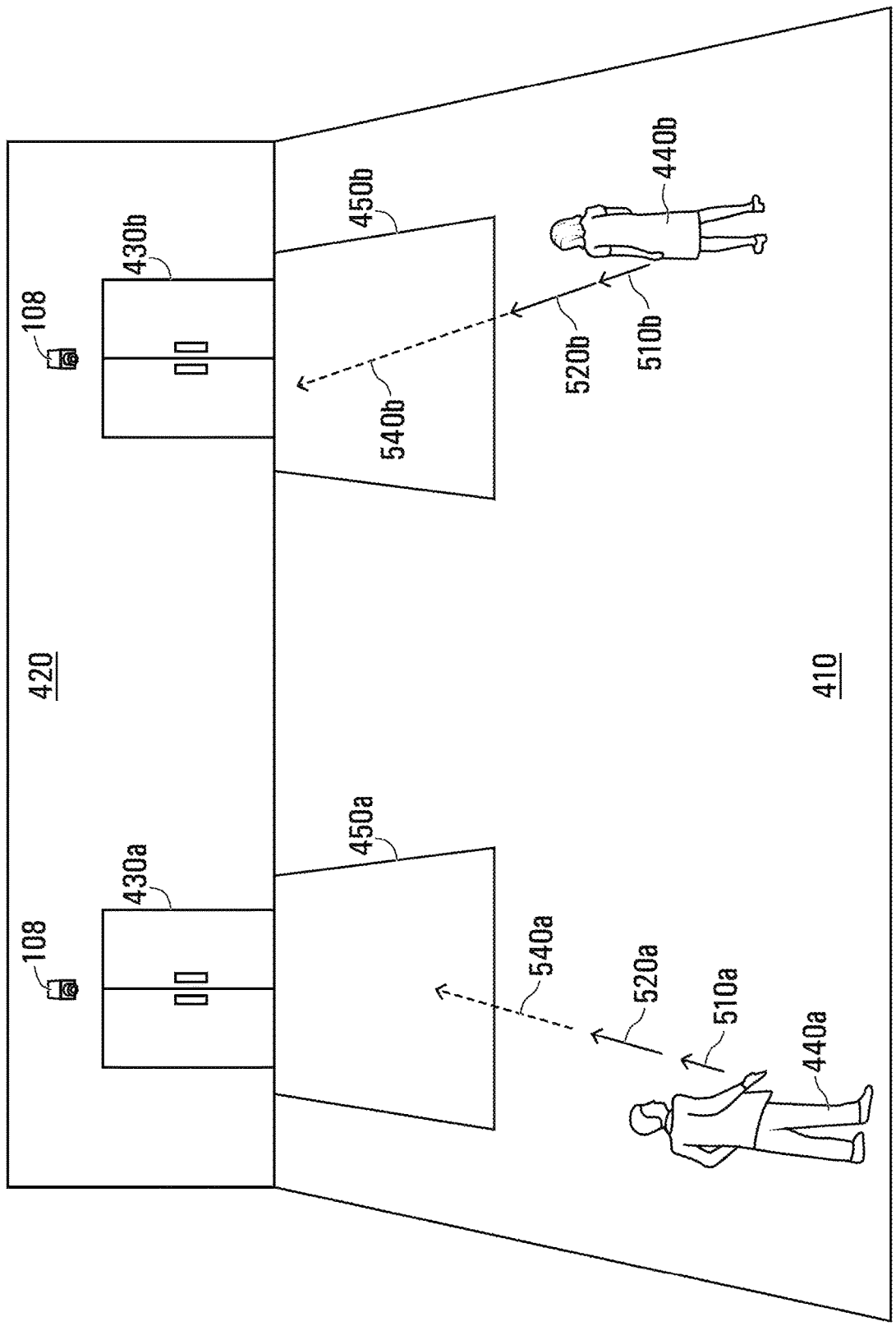
FIG. 5 illustrates the train platform showing passenger movement according to an example embodiment.

Referring now to FIG. 5, an embodiment of the trajectories of passengers 440a and 440b is shown, represented as vectors 510, 520. While only two vectors are shown for each passenger 440a, 440b for ease of representation, typically a greater number will be used.

With reference to passenger 440a, in a first time segment, video analytics module 224 determines 440a moves along the path shown by vector 510a. The first time segment may be as little as the time needed to record the next frame of video, or may represent a number of frames over a certain time period, for example one second. In the second time segment, as determined by video analytics module 224, passenger 440a moves along the path shown by vector 520a. While this still leaves passenger 440a outside of area of interest 450a at the end of the second time segment, the system uses vectors 510a and 520a to project the anticipated path of movement along vector 540a. This anticipated path of movement may be represented by a vector anticipating the location of passenger 440a at the end of the next time segment, or the projected path of movement may be calculated for the remaining length of time until the doors 430 begin closing or doors 430 close.

Vector 540a may be determined by duplicating the previous vector 520a, or may be adjusted based on the acceleration, for example by adding the difference in length of vector 520a to 510a to vector 540a determine the length of vector 540a. In the example illustrated in FIG. 4, vector 540a projects that passenger 440a will be within area of interest 420a, and moving in the direction of door 430a. A calculation can then be made based on the timing of the door 430a closure as to whether to proceed with closing the door or reduce risk by keeping door 430a open as passenger 440a continues to move.

Passenger 440b follows a similar path, along vectors 510b and 520b, with projected movement along vector 540b into area of interest 450b.

Figure 6:
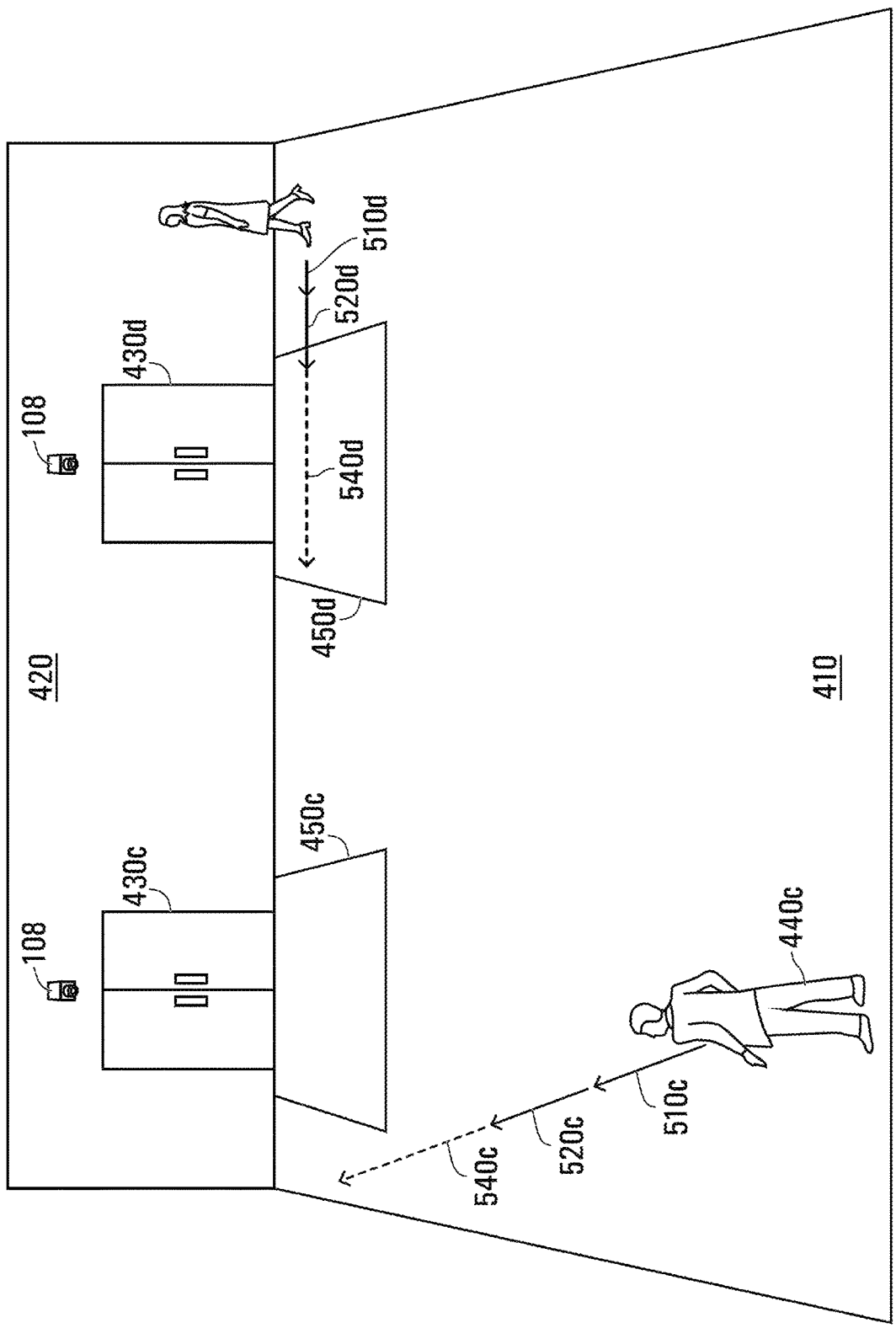
FIG. 6 illustrates the train platform showing passenger movement according to another example embodiment.

Referring to FIG. 6, two further example embodiments are illustrated, in the cases of passengers 440c and 440d. In the case of passenger 440c, after determining vectors 510c and 520c, the anticipated movement along vector 540c, while being relatively close to train 420 does not end in an area of interest 450 or in a direction towards doors 430, and thus doors 430, at least based on the movement of passenger 440c, can close normally.

Likewise passenger 440d, after determining vectors 510d and 520d is projected to move along vector 540d, and thereby bypass door 430d. However with respect to passenger 440d, when determining a likelihood that passenger 440d may impede closing of the automatic door, a consideration that passenger 440d may quickly change direction and is in the area of interest 450d is considered.

There are other means of predicting movement of objects of interest other than that illustrated above. In an embodiment, past vectors may be considered. For example, when a movement vector $v_i$ is generated for a passenger, the vector can be compared to previous vectors of passengers in the past. The set of previous vectors $v_1 \ldots v_n$, within a predetermined distance of $v_i$, which can be determined for example by the absolute value of subtracting $v_i$ from each past vector. Then the actual movement of passengers associated with these previous vectors $v_i \ldots v_n$ can be used in predicting movement following $v_i$, for example an average of $v_i \ldots v_n$, can be used.

In another embodiment a neural network can be used. In this embodiment, the neural network is trained by observing movement patterns on platform 410 for a period of time, for example a week or a month. Then the neural network, on input of a vector $v_i$ associated with a passenger, will be able to output a predicted path of movement for the passenger.

In another embodiment, additional potentially relevant input related to objects of interest can be used, including body pose, eye gaze, age and other demographic information, motion impediments (such as a wheelchair or cane, which for example indicate a person is not likely to have burst of acceleration). Furthermore, appearance search or facial recognition could be used to associate specific persons with specific movement patterns, so for example, system 100 can learn whether a specific person is prone to running towards the doors 430.

Figure 7:
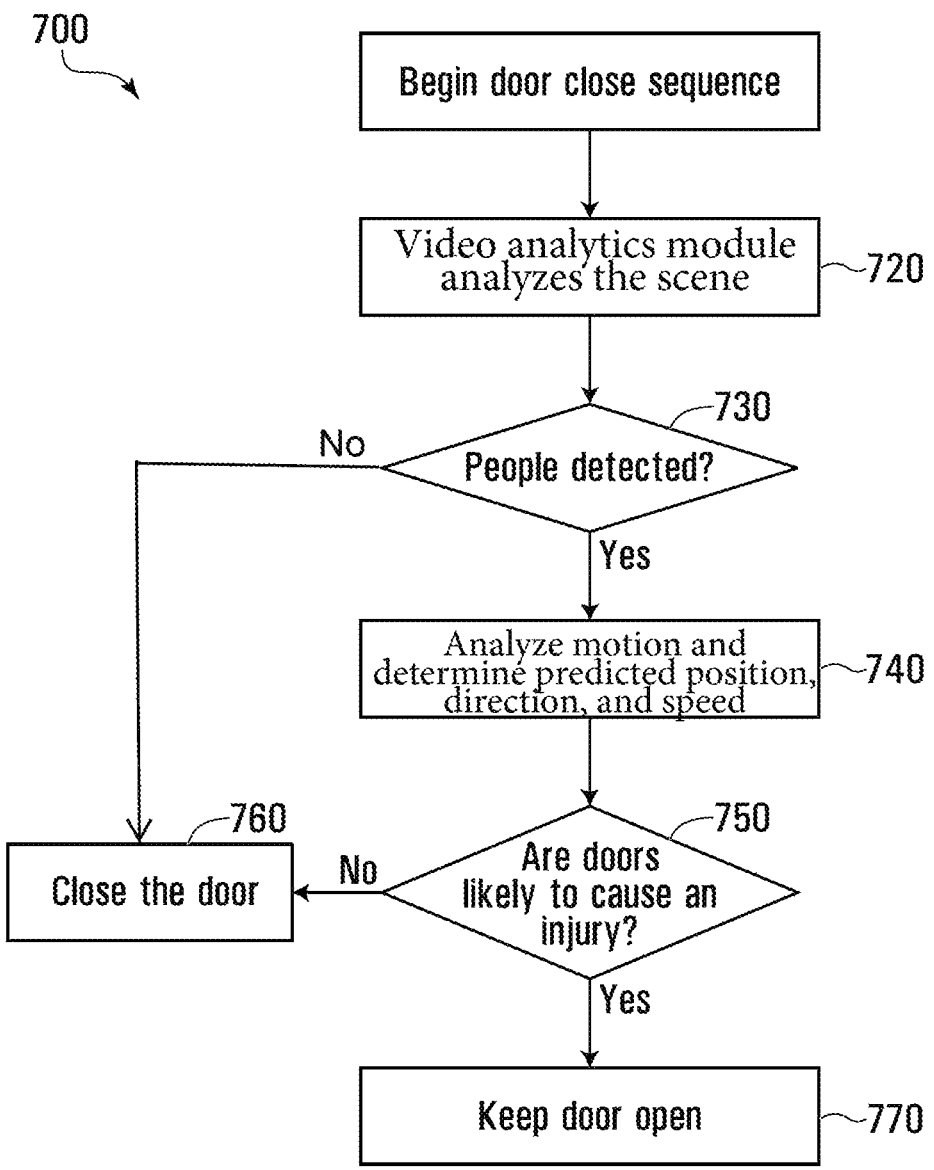
FIG. 7 illustrates a flowchart showing an example embodiment.

With reference to FIG. 7, a flowchart illustrating an embodiment is illustrated. The process 700 begins at a certain time, for example as part of the door 430 closing sequence (step 710). Image capture device 108 then captures and analyzes the scene (step 720). A determination is then made if objects of interest, such as people and passengers 440, are detected (step 730). If no people are detected the door 430 can close as normal (step 760).

If objects of interest, such as people or passengers 440, are detected, then the motion of the object of interest is analyzed, for example by determining the position of the object of interest and vectors 510, 520 and 540, which indicate the direction and speed of the object of interest, which can be used to determine acceleration (step 740).

Image capture device 108, by analyzing intrinsic and extrinsic parameters, is able to determine position, speed, and direction of objects of interest. Detecting and tracking objects of interest can be conducted by using known traditional computer vision techniques or by using neural networks.

Other sensors, such as radar, can be used to assist image capture device 108 to provide position, speed, and direction for objects of interest correlated within image capture device 108's field of view. Similarly, 3D cameras can be sued to provide position, speed, and direction for correlated objects of interest in the image capture device 108's field of view. These additional sensors may be housed with or separately from image capture device 108. In another embodiment, these other sensors can detect and track objects of interest without the need for a 2D camera, however certain functions such as long distance eye gaze determination perform better with 2D cameras.

The next determination is as to what is the likelihood that the object of interest may impede closing of the automatic door and thereby possibly cause an injury (step 750). This likelihood may be based on factors such as vector 540 predicting the movement of the target of interest as well as other factors, such as entry of the passenger into the area of interest 450. Such other factors may include comparing the movement vectors 510, 520 to similar past movement vectors, or obtaining a predicted path of motion from a neural network, may also be used.

The determined likelihood is then compared to a threshold value. If the likelihood is less than the threshold value, then the door 430 can close normally (step 760). If the likelihood is equal to or greater than the threshold value, then door 430 is maintained in an open position (step 770).

In an embodiment, image capture devices 108 may be monitoring both sides of door 430, and thus determine if people entering and exiting through doors 430 may impede closing of the automatic door 430.

In another embodiment sensors, such as radar, may be used instead of, or in addition to, image capture devices 108, to determine position, speed and direction of the objects of interest.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

It is contemplated that any part of any aspect or embodiment discussed in this specification can be implemented or combined with any part of any other aspect or embodiment discussed in this specification.

The above discussed embodiments are considered to be illustrative and not restrictive, and the invention should be construed as limited only by the appended claims.

What is claimed is:

1. A computer implemented method, comprising:
   detecting presence of an object of interest within a plurality of image frames received from a sensor;
   determining that the object of interest is moving towards an automatic door that is configured to close within a predetermined time period;
   determining, based on position, speed and direction of the object of interest, a likelihood that the object of interest may impede closing of the automatic door; and
   when the likelihood exceeds a threshold value, maintaining the automatic door in an open position for a longer period of time than the predetermined time period.

2. The method of claim 1, wherein the sensor is a video camera.

3. The method of claim 2 wherein video analytics are used to determine position, speed and direction of the object of interest.

4. The method of claim 1 wherein the automatic door is positioned on a train.

5. The method of claim 1 wherein the position, speed and direction of the object of interest is defined as at least a vector.

6. The method of claim 5 wherein the vector is used to determine a predicted vector of movement.

7. The method of claim 6 wherein the vector is compared to similar movement vectors generated by the sensor in the past.

8. The method of claim 7 wherein the predicted vector of movement is at least partially based on movement associated with the similar movement vectors generated by the sensor in the past.

9. The method of claim 8 wherein the predicted vector of movement is an average of the similar movement vectors generated by the sensor in the past.

10. The method of claim 1 wherein the automatic door is for an elevator.

11. A system for controlling an automatic door, comprising:
a sensor configured to detect a presence of an object of interest within a plurality of image frames;
a processor, configured to:
determine that the object of interest is moving towards the automatic door, the automatic door configured to close within a predetermined time period;
determine, based on position, speed and direction of the object of interest, a likelihood that the object of interest may impede closing of the automatic door; and
when the likelihood exceeds a threshold value, maintain the automatic door in an open position for a longer period of time than the predetermined time period.

12. The system of claim 11, wherein the sensor is a video camera.

13. The system of claim 12 wherein the processor uses video analytics to determine position, speed and direction of the object of interest.

14. The system of claim 11 wherein the automatic door is positioned on a train.

15. The system of claim 11 wherein the position, speed and direction of the object of interest is defined as at least a vector.

16. The system of claim 15 wherein the vector is used to determine a predicted vector of movement.

17. The system of claim 16 wherein the vector is compared to similar movement vectors generated by the sensor in the past.

18. The system of claim 17 wherein the predicted vector is at least partially based on movement associated with the similar movement vectors generated by the sensor in the past.

19. The system of claim 18 wherein the predicted vector is an average of the similar movement vectors generated by the sensor in the past.

20. The system of claim 11 wherein the automatic door is for an elevator.

\* \* \* \* \*